(12) United States Patent
Krause

(10) Patent No.: US 7,660,093 B2
(45) Date of Patent: Feb. 9, 2010

(54) ARRESTER BLOCK MODULE ASSEMBLY AND METHOD

(75) Inventor: John A. Krause, Medina, OH (US)

(73) Assignee: Hubbell Incorporated, Orange, CT (US)

( * ) Notice: Subject to any disclaimer, the term of this patent is extended or adjusted under 35 U.S.C. 154(b) by 106 days.

(21) Appl. No.: 11/984,674

(22) Filed: Nov. 20, 2007

(65) Prior Publication Data

US 2009/0129030 A1    May 21, 2009

(51) Int. Cl.
*H02H 1/00* (2006.01)

(52) U.S. Cl. .................................. 361/117; 361/127

(58) Field of Classification Search ......... 361/117–120, 361/127
See application file for complete search history.

(56) References Cited

U.S. PATENT DOCUMENTS

| | | |
|---|---|---|
| 4,656,555 A | 4/1987 | Raudabaugh |
| 4,833,438 A | 5/1989 | Parraud et al. |
| 4,899,248 A | 2/1990 | Raudabaugh |
| 4,908,730 A | 3/1990 | Westrom |
| 4,930,039 A | 5/1990 | Woodworth et al. |
| 5,043,838 A | 8/1991 | Sakich |
| 5,057,810 A | 10/1991 | Raudabaugh |
| 5,113,167 A | 5/1992 | Raudabaugh |
| 5,138,517 A | 8/1992 | Raudabaugh |
| 5,291,366 A | 3/1994 | Giese et al. |
| 5,363,266 A | 11/1994 | Wiseman et al. |
| 5,497,138 A | 3/1996 | Malpiece et al. |
| 5,517,382 A | 5/1996 | Leupp et al. |
| 5,602,710 A | 2/1997 | Schmidt et al. |
| 5,680,289 A | 10/1997 | Robinson et al. |
| 5,818,677 A | 10/1998 | Bennett et al. |
| 6,008,975 A | 12/1999 | Kester et al. |
| 6,185,813 B1 | 2/2001 | Donnola |
| 6,396,676 B1 * | 5/2002 | Doone et al. ................. 361/117 |
| 6,777,614 B1 | 8/2004 | Suenwoldt |
| 6,847,514 B2 | 1/2005 | Ramarge et al. |

* cited by examiner

*Primary Examiner*—Danny Nguyen
(74) *Attorney, Agent, or Firm*—Mark S. Bicks; Alfred N. Goodman

(57) ABSTRACT

An electrical surge arrester includes an arrester block stack with a plurality of cylindrical surge arrester components arranged substantially coaxially to form a cylindrical stack of components having a longitudinal axis. First and second electrical conductive terminals are disposed at each end of the block stack and electrically coupled to the components. A spacer is disposed between each of the terminals and the plurality of cylindrical surge arrester components. A crimp pin is disposed in each of the metal terminals to plastically deform the terminals to compress the block stack. Rubber sheds can be directly molded around the device.

17 Claims, 3 Drawing Sheets

ARRESTER BLOCK MODULE ASSEMBLY AND METHOD

FIELD OF THE INVENTION

The present invention relates to an electrical surge arrester having an arrester block stack with a plurality of cylindrical surge arrester components arranged substantially coaxially between first and second metal terminals disposed at each end of the block stack. A spacer is disposed between each of the terminals and the plurality of cylindrical surge arrester components. Also, a crimp pin is disposed in each of the metal terminals to yield or deform an inner end portion of the terminal and thus, exert pressure on the spacers and block stack.

BACKGROUND OF THE INVENTION

Conventional lighting or surge arresters are typically connected to power lines to carry electrical surge currents to ground, thereby preventing damage to lines and equipment connected to the arresters. Arresters offer high resistance to normal voltage across power lines, but offer very low resistance to surge currents produced by sudden high voltage conditions caused by, for example, lightning strikes, switching surge currents or temporary overvoltages. After the surge, the voltage drops and the arrester normally returns to a high resistance state. However, upon arrester malfunction or failure, the high resistance state is not resumed, and the arrester continues to provide an electrical path from the power line to ground. Ultimately, the line will fail due to a short circuit condition or breakdown of the distribution transformers, and the arrester will require replacement.

To avoid line lockout, disconnector assemblies are commonly used in conjunction with arresters to separate a malfunctioning arrester from the circuit and to provide a visual indication of arrester failure. Conventional disconnector assemblies have an explosive charge to destroy the circuit path and physically separate the electrical terminals. Examples of such disconnector assemblies are disclosed in U.S. Pat. No. 5,952,910 to Krause and U.S. Pat. Nos. 5,057,810 and 5,113,167 to Raudabaugh, as well as U.S. Pat. No. 5,434,550 to Putt, U.S. Pat. No. 4,471,402 to Cunningham and U.S. Pat. No. 4,609,902 to Lenk, the subject matter of each of which are hereby incorporated by reference.

Conventional surge arrester modules include a plurality of Bellville washers to keep compression on the blocks. The Bellville washers compress the blocks and take up the tolerance of the block stack as the block stack relaxes. Removing the Bellville washers requires another method for compressing the blocks.

Accordingly, a need exists for an improved surge arrester with a mechanism for compressing the blocks of the block stack wrapped by a fiberglass material.

SUMMARY OF THE INVENTION

Accordingly, an object of the invention is to provide a surge arrester having at least one crimp pin inserted in an end terminal opening to compress the block stack and provide tension in a fiberglass wrapping.

Another object is to provide a surge arrester that can have a rubber shed directly molded around it.

A further object is to provide a surge arrester having a plurality of soft metal disks with concentric circles disposed between the end terminals for preventing rubber from penetrating between the surfaces.

Still another object is to provide an apparatus for preventing the arrester from losing electrical contact by providing a structure for withstanding leakage of injected rubber between a plurality of module component joints.

Yet another object of the invention is to provide a method of assembling an electrical surge arrester with crimp pins acting on first and second metal terminals to compress first and second spacers at axial ends of the block stack that exert compressive forces on the cylindrical surge arresters.

The foregoing objects are basically attained by providing an electrical surge arrester assembly having a block stack with a plurality of cylindrical surge arrester components arranged substantially coaxially to form a cylindrical stack of components having a common longitudinal axis. First and second electrical conductive terminals are disposed at each end of the block stack, and are electrically coupled to the components. Each of the surge arrester components is adjacent to a first crush plate and a second crush plate at opposite ends. A crimp pin is disposed in each of the metal terminals to compress the block stack by exerting a force on the lower end of the terminals which compress spacers at the first and second terminals.

The foregoing objects are also attained by providing a method of assembling an electrical surge arrester comprising the steps of arranging a plurality of cylindrical surge arrester components substantially coaxially to form an arrester block stack. First and second electrically conductive and ductile terminals are disposed at opposite ends of the block stack with the terminals being electrically coupled to the components. A spacer is positioned between each of the terminals and the adjacent surge arrester components. At least one crimp pin is inserted into each of the metal terminals and plastically deforms the interior ends of the terminals to compress the block stack.

By forming the surge arrester in this manner, rubber sheds can be directly molded around the device with crush plates placed between each joint adjacent the cylindrical surge arrester components to keep rubber from penetrating between the surfaces. As such, the higher the contact pressure in the block stock, the less likely it will be for the injected rubber to leak between the module component joints and cause the arrester to lose electrical contact.

As used in this application, the terms "top", "bottom", and "side" are intended to facilitate the description of the invention, and are not intended to limit the present invention to any particular orientation.

Other objects, advantages, and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which forms a part of this disclosure.

Throughout the drawings, like reference numerals will be understood to refer to like parts, components, and structures.

DETAILED DESCRIPTION OF THE INVENTION

Figure 1:
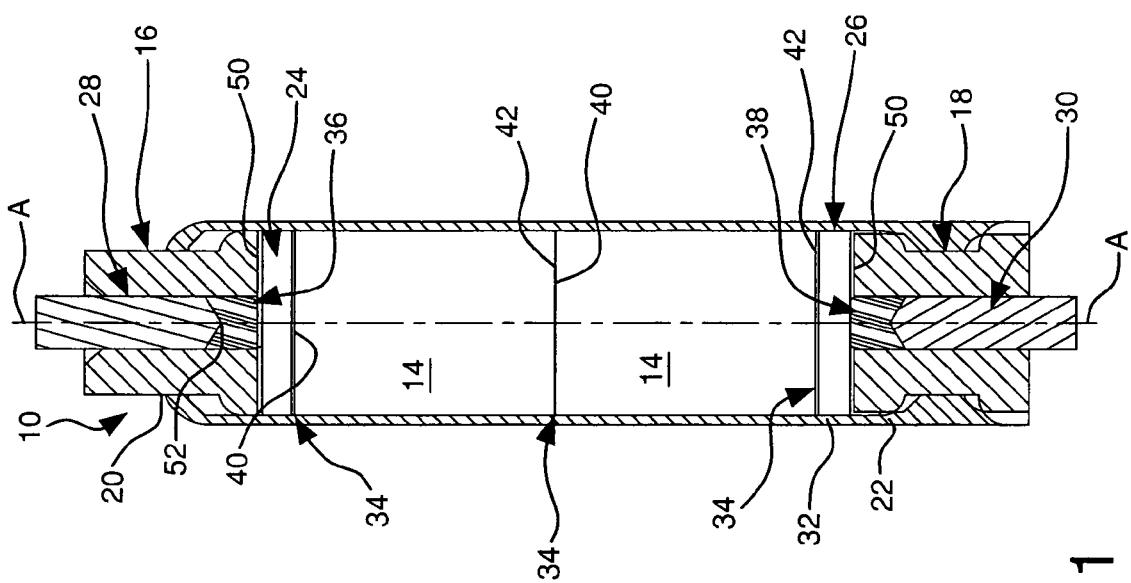
FIG. 1 is a front elevational view in section of the electrical surge arrester block module with both terminals under minimal compression according to an embodiment of the present invention.
Figure 2:
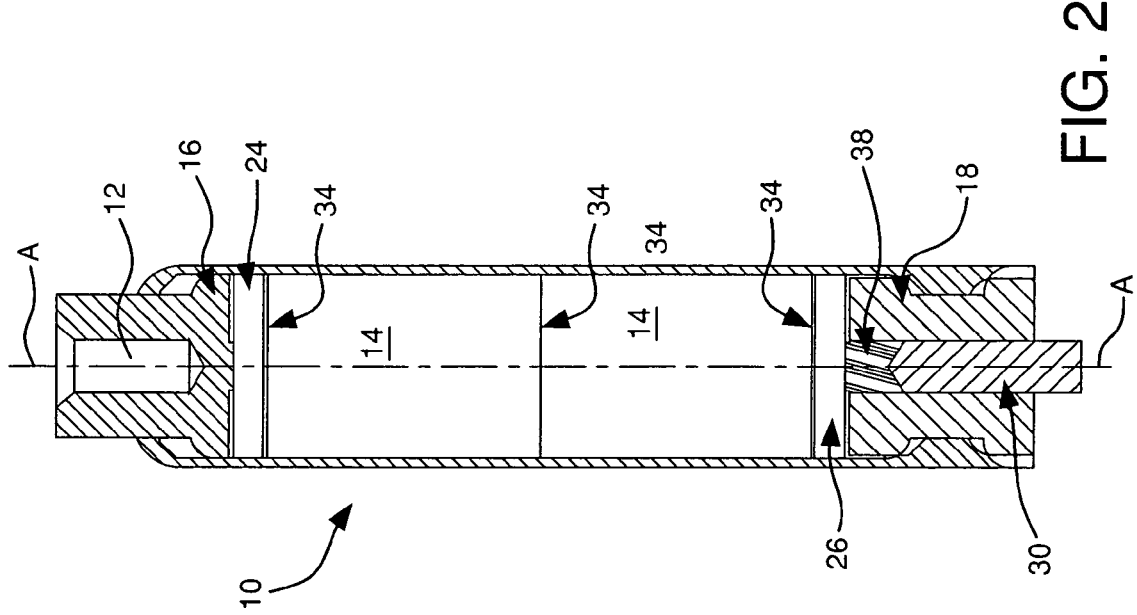
FIG. 2 is a front elevational view in section of the electrical surge arrester block module of FIG. 1 before a crimp pin is inserted into one of the terminals and the other terminal under minimal compression.

Turning to FIGS. 1 and 2, an electrical surge arrester block module 10 or assembly includes an arrester block stack with a plurality of cylindrical surge arrester components 14 arranged substantially coaxially between a first electrically conductive or metal ductile terminal 16 and a second electrically conductive or metal ductile terminal 18 disposed at opposite ends of the block stack. Spacers 24, 26 are disposed between each of the terminals 16, 18 and the plurality of cylindrical surge arrester components 14. The block module 10 also includes at least one crimp pin 28, 30 disposed in each of the metal terminals 16, 18 to control the compression in the block stack.

The electrical surge arrester block module 10 includes a first end 20 and a second end 22 with the block stack arranged therebetween. The external surface of the block module 10 can be wrapped with a fiberglass epoxy matrix 32 and a plurality of rubber sheds 33. The contact pressure in the block stack is inversely related to the residual space between the components 14. Thus, the higher the contact pressure in the block stack, the less likely it will be for the injected rubber to leak between the module component joints and cause the arrester 10 to lose electrical contact.

The plurality of cylindrical surge arrester components 14 contained in the block stack are arranged substantially coaxially to form a cylindrical stack of components 14 having a longitudinal axis A. The first electrically conductive terminal 16 located at the first end 20 and the second electrically conductive terminal 18 located at the second end 22 are electrically coupled to the components 14.

The surge arrester components 14 are compressed toward the middle of the surge arrester block module 10. The components 14 are each adjacent to at least two crush plates 34 such that a first crush plate 34 is adjacent to a first end 40 of each surge arrester component 14 and a second crush plate 34 is adjacent to a second end 42 of each surge arrester component 14.

Figure 7:
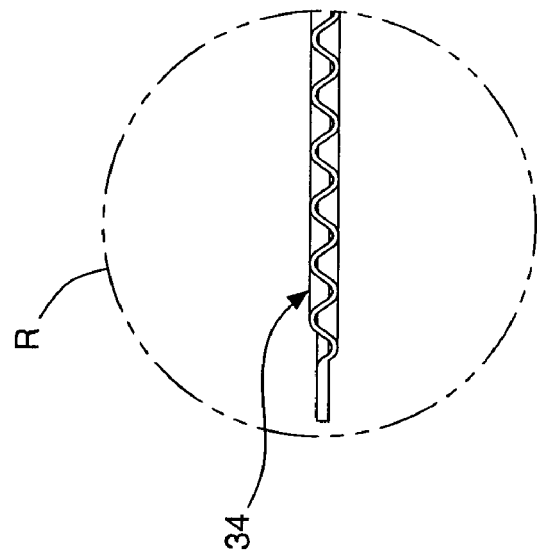
FIG. 7 is a close up side elevational view of the circle R of the crush plate of FIG. 6.
Figure 5:
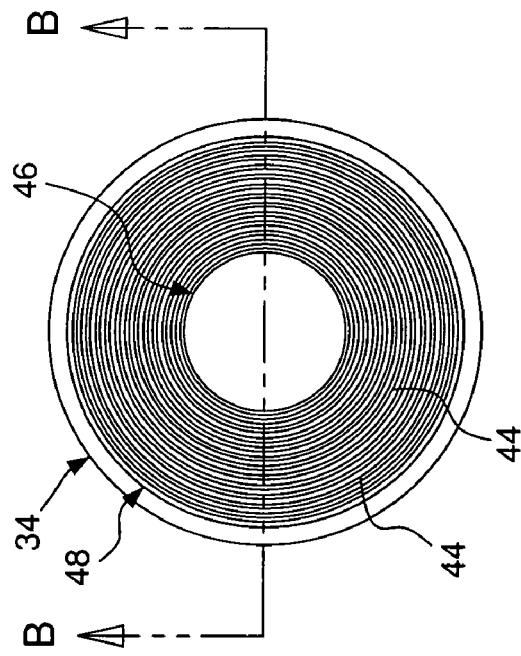
FIG. 5 is a top plan view of a crush plate disposed between the cylindrical surge arresters.
Figure 6:
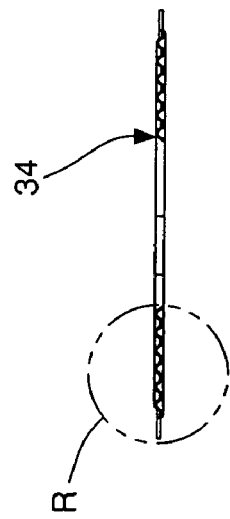
FIG. 6 is a side elevational view in section of the crush plate of FIG. 5 along the line B-B.

As seen in FIGS. 5-7, each of the crush plates 34 is a soft metal disk having a plurality of concentric circles 44 stamped on the surface between an innermost circle 46 and an outermost circle 48. In this manner, the crush plates 34 prevent the rubber from penetrating between the surfaces such that the spaces between each of the surge arrester components 14 upon compression of the block stack by the crimp pins 28, are solely filled with the crush plates 34.

The spacers are adjacent to the outermost crush plates 34. The first spacer 24 is adjacent to the first end 20 of the surge arrester block module 10, and the second spacer 26 is adjacent to the second end 22 of the surge arrester block module 10 such that the block stack is bordered at each end 20, 22 by first and second spacers 24, 26. The spacers 24, 26 are located at opposite ends 40, 42 of the block stack to cushion spread the load of the crimping operation and to prevent any possible cracking from point loading.

On the outermost ends of the block stack and spacers 24, 26, the surge arrester block module 10 includes a first terminal 16 and a second terminal 18 electrically coupled to the components 14. The interior ends 50 of the terminals 16, 18 face the spacers 24, 26. Each of the terminals 16, 18 includes an internally threaded bore 12 for receiving a crimp pin 28, 30 made of metal. When crimp pins 28, 30 are inserted into each of the terminal bores, the block stack compression begins.

The first terminal 16 and the second terminal 18 are made of ductile metal, preferably aluminum, and include threaded bores 12 along the longitudinal axis A. To compress the block stack, the first metal terminal 16 receives a first crimp pin 28 through its bore 12 and the second metal terminal 18 simultaneously receives a second crimp pin 30 through its bore 12.

Operation

As seen in FIG. 1, the block stack is under minimal compression. A first crimp pin 28 is inserted into bore 12 in the first terminal 16 and a second crimp pin 30 is similarly received in the bore 12 of the second terminal 18 to yield the crimp areas 36, 38 adjacent the spacers 24, 26 and terminal ends 50. The threaded bores 12 and crimp pins 28, 30 do not extend along the entire length of the terminals 16, 18. The crimp pins 28, extend towards the center of the block stack to transmit a compressive force throughout the surge arrester block module 10.

Yielding occurs because the crimp pins 28, 30 are inserted through the threaded bores 12 until the interior ends 50 of the terminals 16, 18 deflect or deform along longitudinal axis A toward components 14. These terminal portions where yielding occurs are crimp area 36, 38.

Figure 4:
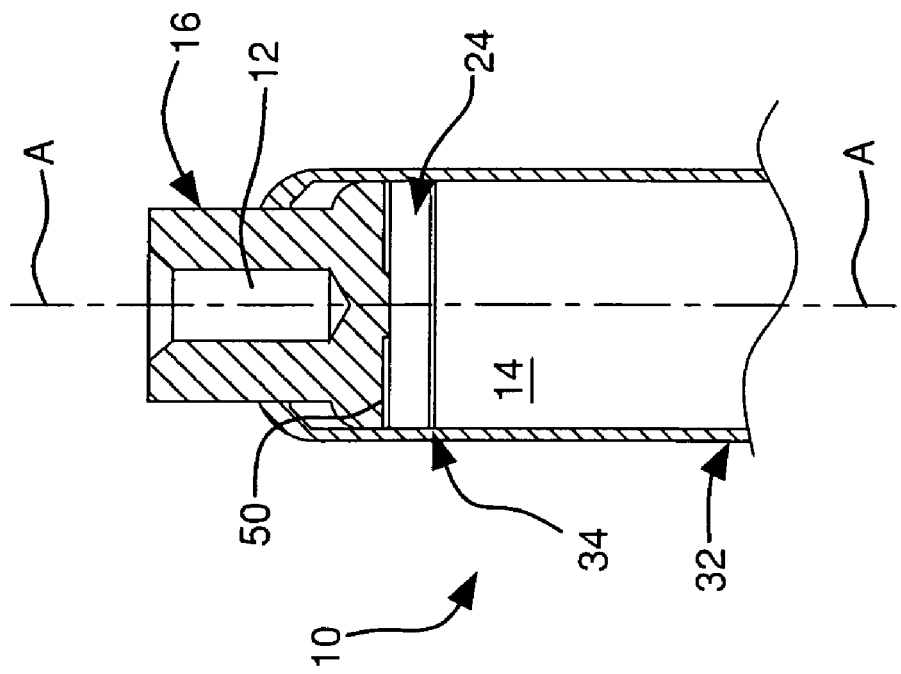
FIG. 4 is a partial front elevational view in section of the electrical surge arrester block module of FIGS. 1-3 after the crimp pins are removed and the block stack is under residual loading.
Figure 3:
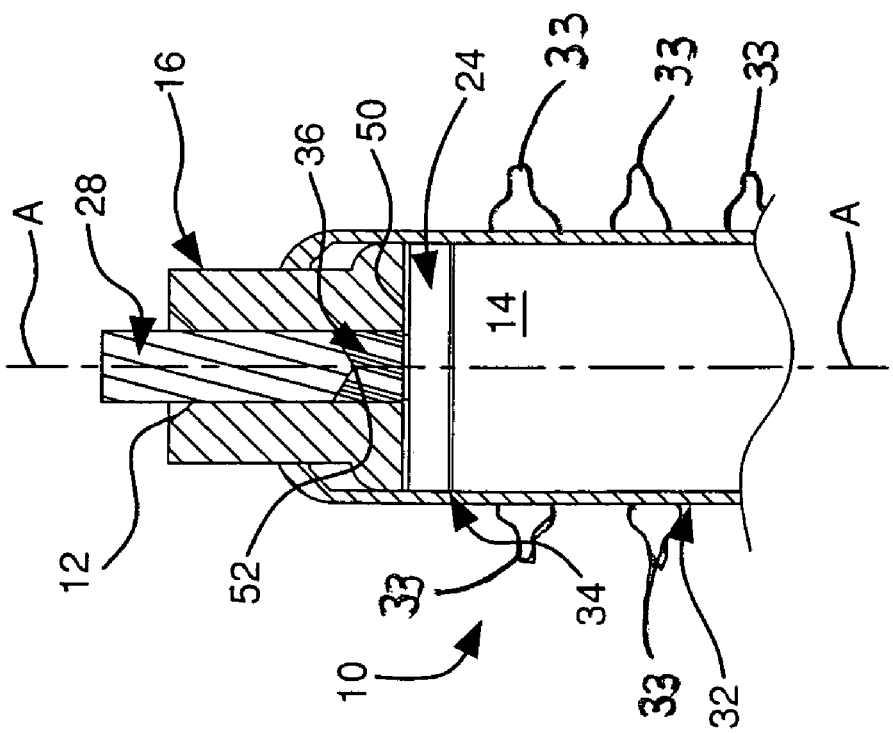
FIG. 3 is a partial front elevational view in section of the electrical surge arrester block module of FIGS. 1 and 2 with the block stack under crimp load when the crimp pin is inserted into the terminal.

For purposes of illustration, the application of compressive force on components 14 via the crimp pins to the block stack is depicted in FIGS. 2-4 at the first terminal 16, but the sequence occurring towards the upper end 20 of the block stack simultaneously occurs at the lower end 22 of the module with the second terminal 18 to effectively transmit force to both ends of the block stack.

FIG. 2 illustrates the first terminal 16 prior to insertion of the crimp pin 28 in the bore 12 and the second terminal 18 with the crimp pin 30 inserted (as illustrated in FIG. 1). More specifically, the lower crimp pin 30 illustrates the block stack under minimal compression, just prior to crimp load. The second channel or crimp area 38 is formed at the end of the crimp pin 30 close to the interior end 50 of the second terminal 18 and adjacent the second spacer 26. The sequence of crimping is illustrated with respect to the first terminal 16.

Turning to FIG. 3, the crimp pin 28 is inserted through the bore 12 such that the apex 52 of the crimp pin 28 close to the interior end 50 of the first terminal 16 and adjacent the spacer 24 creates the crimp area 36 by moving inwardly to deform the portion of the aluminum terminal 16 between the inner end of bore 12 and the inner end surface of the terminal 16. At this stage, the block stack is under crimp load and it is clear that the distance between the apex 52 of the pin 28 and the spacer 24 is less than the distance between the apex 52 and the spacer 24 of FIG. 1 when the block stack is under minimal compression because the crimp pin 28 advances towards the spacer 24. The crimp pin 28 is inserted through the terminal bore 12 until the terminal yields and plastically deforms the terminal 16 at the crimp area 36. The entire assembly 10 is placed into a press or fixture with the pins 28, and crimp force is applied. Moreover, the press is used to apply pressure to the pins 28 and cause the crimping. This deformation of the terminal 16 portion applies compressive load to the spacer 24 beneath the terminal 16.

When the terminal 16 yields to the pressure of the crimp pin 28, the action creates a compressive force causing the spacer 24 to transmit compressive forces onto the crush plates 34 and then, onto the cylindrical surge arrester components 14.

Turning to FIG. 4, when the crimp pin 28 is removed from the first terminal 16, the yielded end fitting material of the terminal remains deformed and maintains compression on the block stack, exhibiting residual loading. Ultimately, this action causes the stack of cylindrical surge arresters 14 to move closer together. This allows more axial compression of the block stack, without using a Bellville washer, than the assembly 10 alone could obtain. It also increases the surface pressure of the electrical contacts.

When a particular embodiment has been chosen to illustrate the invention, it will be understood by those skilled in the art that various changes and modifications can be made therein without departing from the scope of the invention as defined in the appended claims.

What is claimed is:

1. An electrical surge arrester assembly, comprising:
    an arrester block stack having a plurality of cylindrical surge arrester components arranged substantially coaxially;
    first and second electrically conductive and ductile terminals disposed at opposite ends of said block stack and electrically coupled to said components;
    a spacer between each of said terminals and said plurality of cylindrical surge arrester components; and
    at least one crimp pin disposed in each of said metal terminals and deforming said terminals to compress said block stack.

2. An electrical surge arrester assembly according to claim 1 wherein
    a fiberglass epoxy matrix is wrapped about and axially retains said components, spacers and terminals.

3. An electrical surge arrester assembly according to claim 2 wherein
    a plurality of rubber sheds is molded on said fiberglass epoxy matrix.

4. An electrical surge arrester assembly according to claim 1 wherein
    each of said surge arrester components is adjacent to at least one crush plate.

5. An electrical surge arrester assembly according to claim 4 wherein
    each of said surge arrester components is adjacent to a first crush plate at a first end and a second crush plate at a second end.

6. An electrical surge arrester assembly according to claim 4 wherein
    said crush plates are soft metal disks having a plurality of concentric circles embossed thereon.

7. An electrical surge arrester assembly according to claim 1 wherein
    each of said crimp pins is disposed in said metal terminal.

8. An electrical surge arrester assembly, comprising:
    an arrester block stack having a plurality of cylindrical surge arrester components arranged substantially coaxially to form a cylindrical stack of components having a longitudinal axis;
    first and second electrically conductive and ductile terminals disposed at each end of said block stack and electrically coupled to said components;
    a spacer between each of said terminals and said plurality of cylindrical surge arrester components, each of said surge arrester components being adjacent to a first crush plate at a first end and a second crush plate at a second end; and
    at least one crimp pin disposed in each of said metal terminals and deforming said terminals, each of said crimp pins plastically deforming a crimp area adjacent to an interior end of the respective terminal to compress said block stack.

9. An electrical surge arrester assembly according to claim 8 wherein
    a fiberglass epoxy matrix is wrapped about and axially retains said components, spacers and terminals.

10. An electrical surge arrester assembly according to claim 9 wherein
    a plurality of rubber sheds is molded on said fiberglass epoxy matrix.

11. An electrical surge arrester assembly according to claim 8 wherein
    said crush plates are soft metal disks having a plurality of concentric circles embossed thereon.

12. A method of assembling an electrical surge arrester, said method comprising the steps of:
    arranging a plurality of cylindrical surge arrester components substantially coaxially to form an arrester block stack;
    disposing first and second electrically conductive and ductile terminals at opposite ends of the block stack and electrically coupling the terminals to the components;
    positioning a spacer between each of the terminals and the adjacent surge arrester components; and
    inserting at least one crimp pin into each of the metal terminals and plastically deforming interior ends of the terminals to compress the block stack.

13. A method of assembling an electrical surge arrester according to claim 12 further including the steps of wrapping the block stack, terminals and spacers with a fiberglass epoxy matrix and covering the matrix with a plurality of rubber sheds.

14. A method of assembling an electrical surge arrester according to claim 12 and further including the step of removing the crimp pins from the metal terminals while maintaining compression of the block stack.

15. A method of assembling an electrical surge arrester according to claim 13 and further including the step of removing the crimp pins from the metal terminals while maintaining compression of the block stack.

16. A method of assembling an electrical surge arrester according to claim 12 further including the step of providing at least one crush plate between each spacer and the adjacent cylindrical surge arrester component to prevent rubber molded thereon from penetrating therebetween.

17. A method of assembling an electrical surge arrester according to claim 13 wherein each of the surge arrester components is adjacent to at a first crush plate at a first end and a second crush plate at a second end.

* * * * *